D. GUELBAUM.
DIFFUSED HEAT RADIATION CHAMBER FOR HOME COOKING AND BAKING.
APPLICATION FILED MAY 26, 1921.
1,411,274. Patented Apr. 4, 1922.
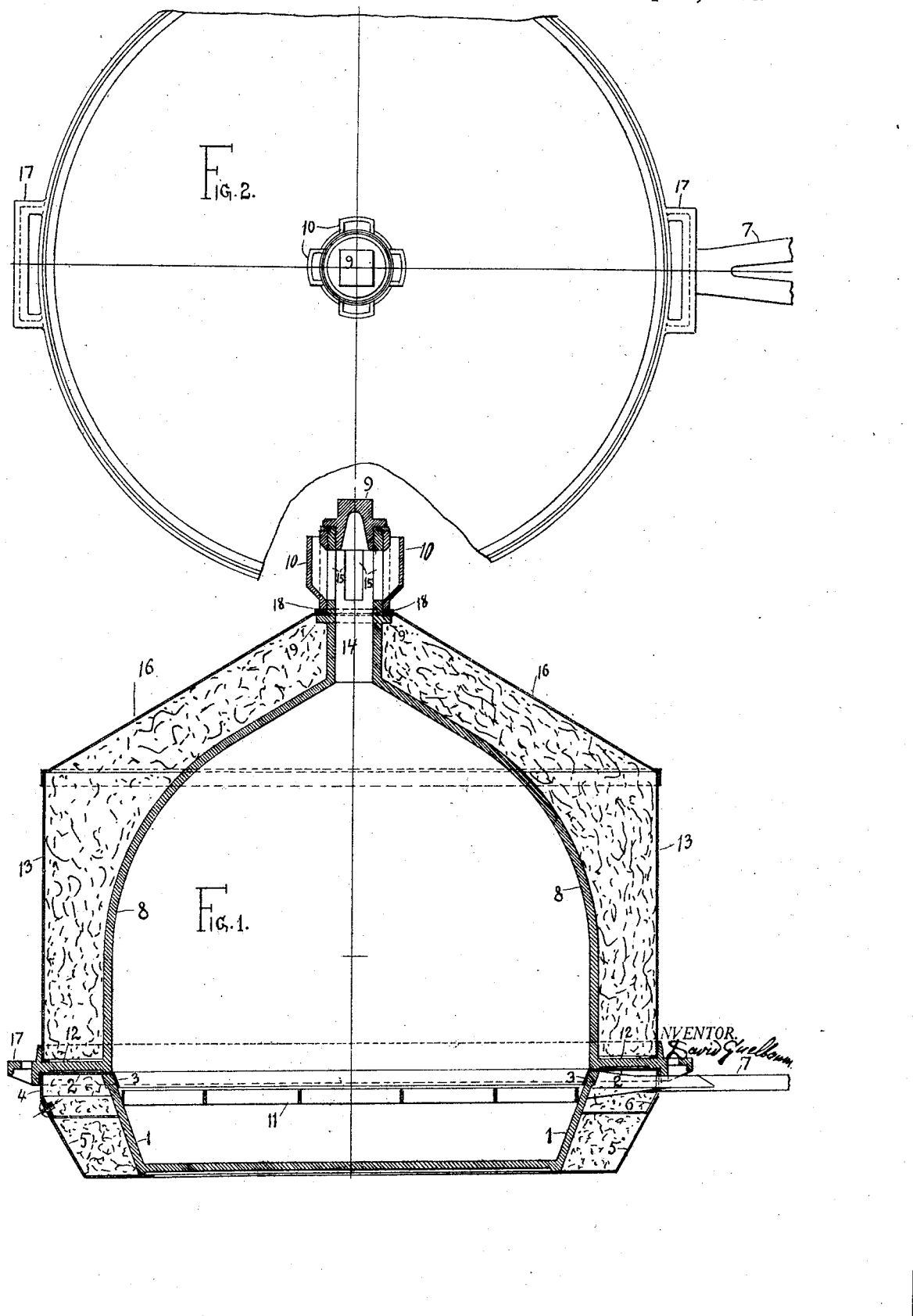

UNITED STATES PATENT OFFICE.

DAVID GUELBAUM, OF SYRACUSE, NEW YORK.

DIFFUSED-HEAT-RADIATION CHAMBER FOR HOME COOKING AND BAKING.

1,411,274.    Specification of Letters Patent.    Patented Apr. 4, 1922.

Application filed May 26, 1921. Serial No. 472,649.

*To all whom it may concern:*

Be it known that I, DAVID GUELBAUM, a citizen of the United States, and a resident of Syracuse, in the county of Onondaga and State of New York, have invented a certain new and useful Diffused-Heat-Radiation Chamber for Home Cooking and Baking, of which the following is a specification.

This invention of a diffused heat radiation chamber for home cooking and baking has for its object better home cooking and baking with much saving in time and fuel, by means of diffused heat transmission within a closed insulated chamber, with no contact of the food container with outside air or combustion gases, and with the vapor outlet made adjustable. And this present patent application forms an extension and supplement to my previous patent application for a diffused heat radiation apparatus or oven, filed April 18, 1921, Ser. #462,371, the present patent application differing from the previous one by various simplifications, having for their purpose to make its utilization general and accessible to every home.

My invention comprises the above novel features, embodied in combinations and constructions, as hereinafter set forth and claimed, and as shown on the accompanying drawings, in which like characters designate the same corresponding parts in all the views.

Fig. 1 is a sectional elevation of my diffused heat radiation chamber.

Fig. 2 is a top view of the same.

As shown on Fig. 1 the radiation chamber is composed of the common cast-iron frying pan 1, such as is found in every home, said frying pan serving as the heat absorbing base of the radiation chamber, taking the place of the specially designed heat absorbing base used in my said previous patent application.

To prevent dissipation and loss of heat, the outer side-surface of the frying pan is surrounded by a light sheet metal jacket fitted to it, composed of two halves, connected together by small screws. The upper part 2 consists of a double flanged pan; the inner flange 3 fits the top of the frying pan, as shown, while the outer flange 4 fits the bottom flange 12 of the dome 8, or the similar bottom of any intermediate extension ring or compartment that may be inserted between the dome and the frying pan, such as used in my said previous patent application.

To this outer flange 4 is attached with screws, as shown, the lower part or beveled shield 5, the bottom of which is fastened to the bottom of the frying pan (screws not shown). The upper flange 4 is notched out at 6 to clear the handle 7 of the frying pan.

The air space inside the jacket may be left empty, or may be filled up with insulating composition.

Inside the frying pan is placed the screen or grating 11, made up of light metal strips notched in half in half. This screen rests on the tapered sides of the frying pan, and is the same as used in my said previous patent application, serving to prevent direct contact with the frying pan bottom.

On top of the heat absorbing frying pan with its insulating jacket and screen is placed the dome 8 with its bottom flange 12 overlapping the flange 4 of the plate 2 and carrying the insulating sheet metal jacket 13. The dome terminates on top with a prolonged nozzle 14, flanged in the middle for supporting the jacket cover 16 and the rotating vapor outlet regulating valve 10, with the washer 18 between to take up the friction.

Above the flange 19 the nozzle is provided with several longitudinal slots 15 for the vapor outlet. Above these slots the nozzle is closed by the screw plug 9.

Around the nozzle above the flange 19 is fitted the rotating valve 10, by which the vapor outlet slots 15 can be closed or opened as much as desired.

The space between the dome 8 and the jackets 13 and 16 is filled up with heat insulating composition.

The dome is provided with the two handles 17, as shown on Figs. 1 and 2.

The dome here shown differs from the dome used in my said previous patent application in the following features:

1. Its top is spherical instead of conical, for better radiation.

2. It has no air inlet holes at the bottom for hot air circulation.

3. It has no interior hot air circulation jacket and no thermometer on top, but a screw plug closing the top nozzle.

The vapor outlet regulating valve 10 is the same as used in my said previous patent application.

The interior of the insulated dome 8, plus any intermediate extension rings or compartments with screens that may be inserted between the dome and the frying pan, together with the insulated frying pan and screen, form combinedly the closed diffused heat radiation chamber, whose action is as follows:

The container or utensil with the product to be cooked or baked is placed on top of the screen 11 inside the radiation chamber. The bottom of the insulated frying pan, placed over any fire or burner, absorbs the intense heat, which—the whole chamber being thoroughly insulated—spreads without loss over the interior metal surface of the chamber and is wholly transmitted by diffused radiation to the food container, simultaneously and uniformly all over its surface. The evaporation or ebullition that is to take place is regulated by the vapor outlet valve 10, which may be closed or opened as much as desired.

As experiment shows, heat transmission by diffused radiation to a container within a closed thoroughly insulated radiation chamber, is more rapid and penetrating than would have taken place by direct open contact of but a portion of the surface of the same container with the high temperature combustion gases.

After the cooking or baking has taken place for a certain interval of time, the heat may be cut off, and the frying pan with the dome placed over an asbestos or other insulating pad, and the heat is thus preserved for many hours, the same as in a fireless cooker.

What I claim is:

1. A diffused heat radiation chamber, comprising an insulated spherically shaped dome flanged at the bottom, a frying pan provided with a screen inside and with an attachable insulating jacket outside and supporting the flange of said dome, substantially as and for the purpose specified.

2. A diffused heat radiation chamber, comprising an insulated dome having a slotted nozzle on top closed by a screw plug and provided with a vapor outlet regulating valve and having a flanged bottom made to fit the top of any frying pan, a frying pan supporting said dome and provided with an attached insulating jacket, substantially as and for the purpose set forth.

3. A diffused heat radiation chamber, comprising an insulated dome with a vapor outlet on top and a flanged bottom, and a frying pan provided with a carrier screen inside and an insulating jacket outside made in two halves joined together and supporting the bottom flange of said dome, substantially as and for the purpose described.

In testimony whereof, I have hereunto signed my name at Syracuse, in the county of Onondaga, and State of New York, this 24th day of May, 1921.

DAVID GUELBAUM.